March 30, 1943.  J. F. JOY  2,315,430
KERF CUTTING MACHINE
Filed July 21, 1938  10 Sheets-Sheet 1

Inventor:
Joseph F. Joy.
by Louis A. Maxson.
Atty.

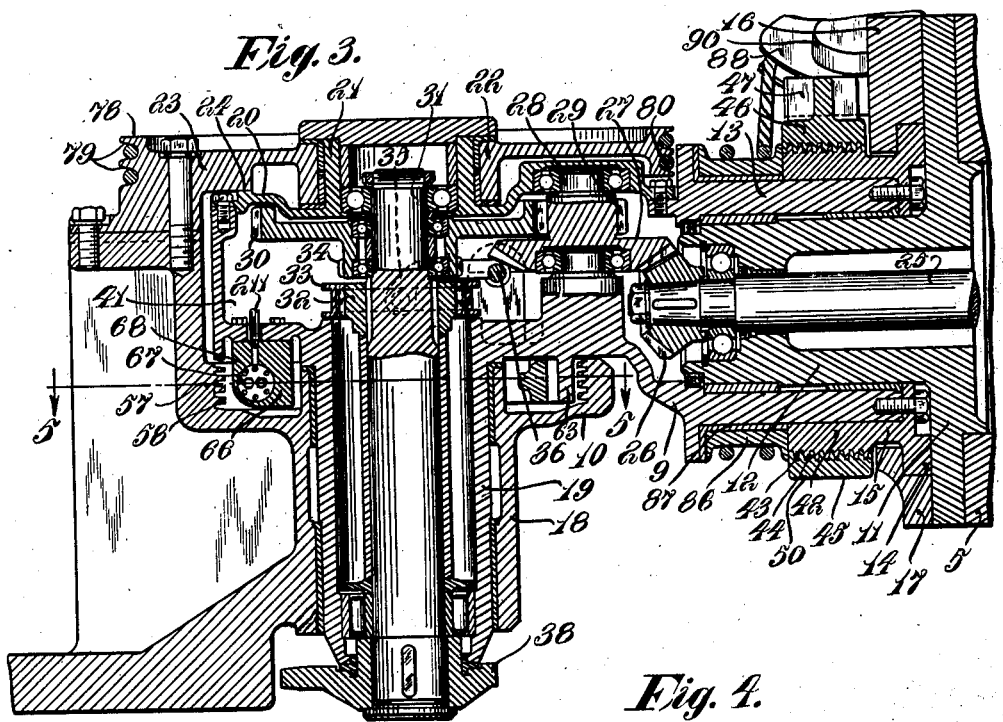
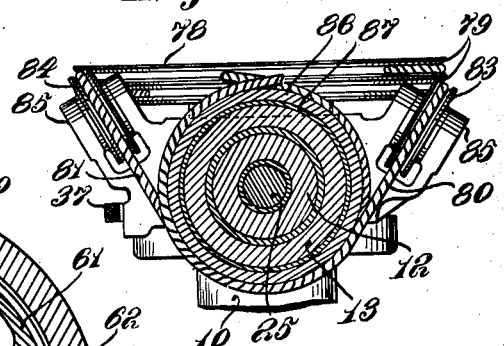
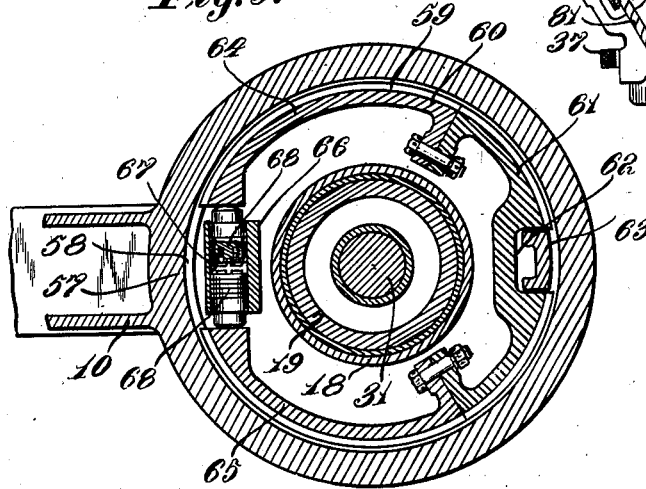

March 30, 1943.                J. F. JOY                2,315,430
                         KERF CUTTING MACHINE
                         Filed July 21, 1938        10 Sheets-Sheet 3
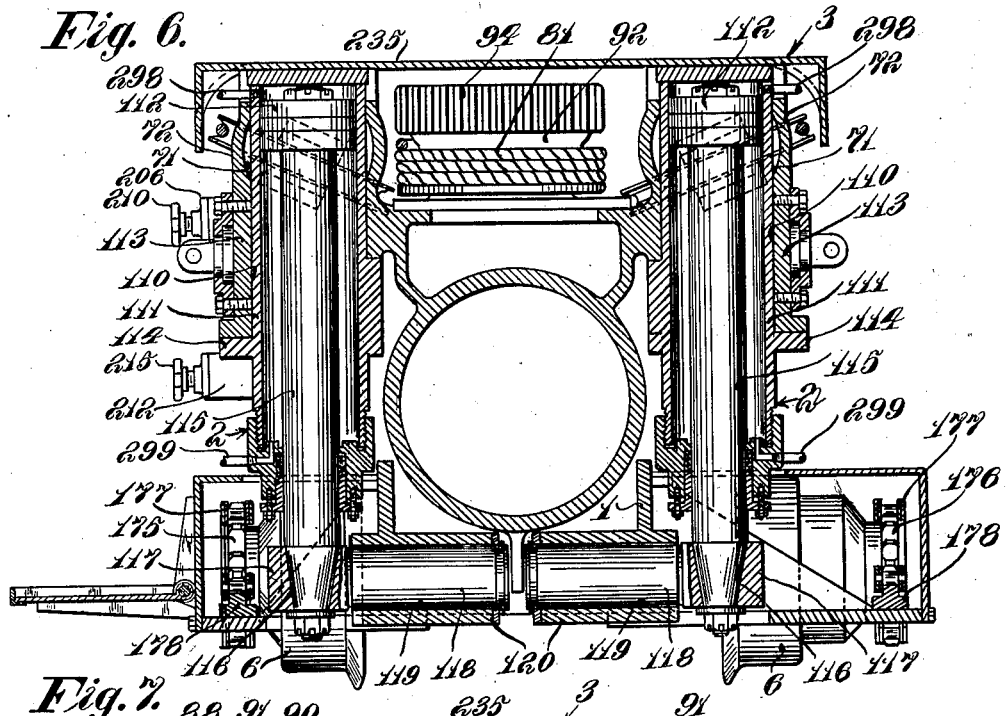
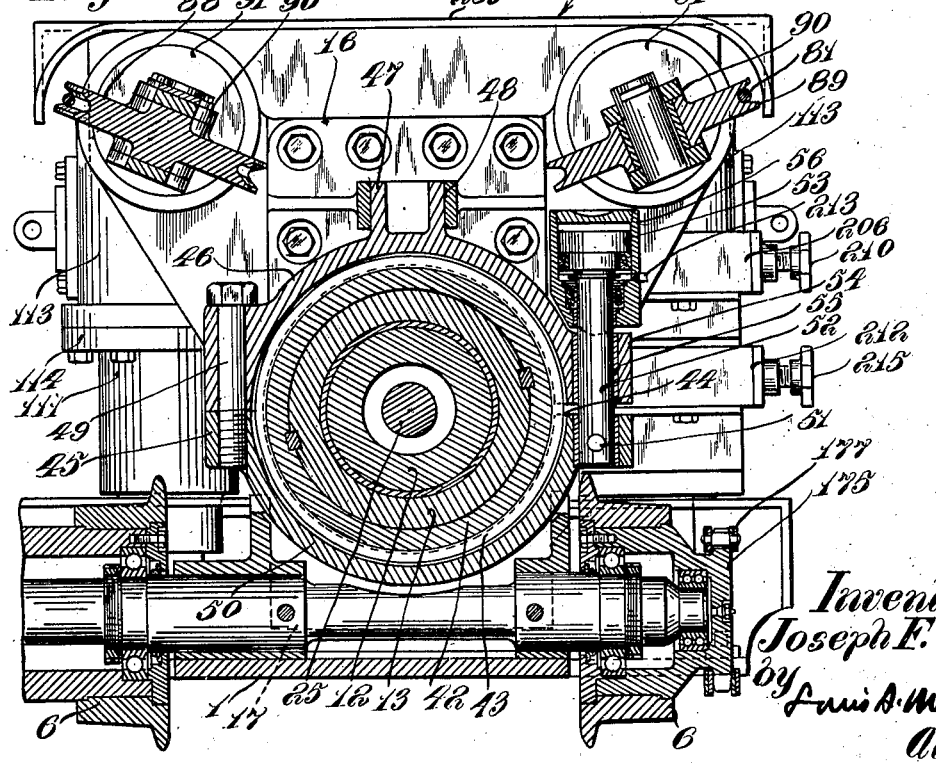
Inventor:
Joseph F. Joy
by [signature]
Atty.

March 30, 1943. J. F. JOY 2,315,430
KERF CUTTING MACHINE
Filed July 21, 1938 10 Sheets-Sheet 4
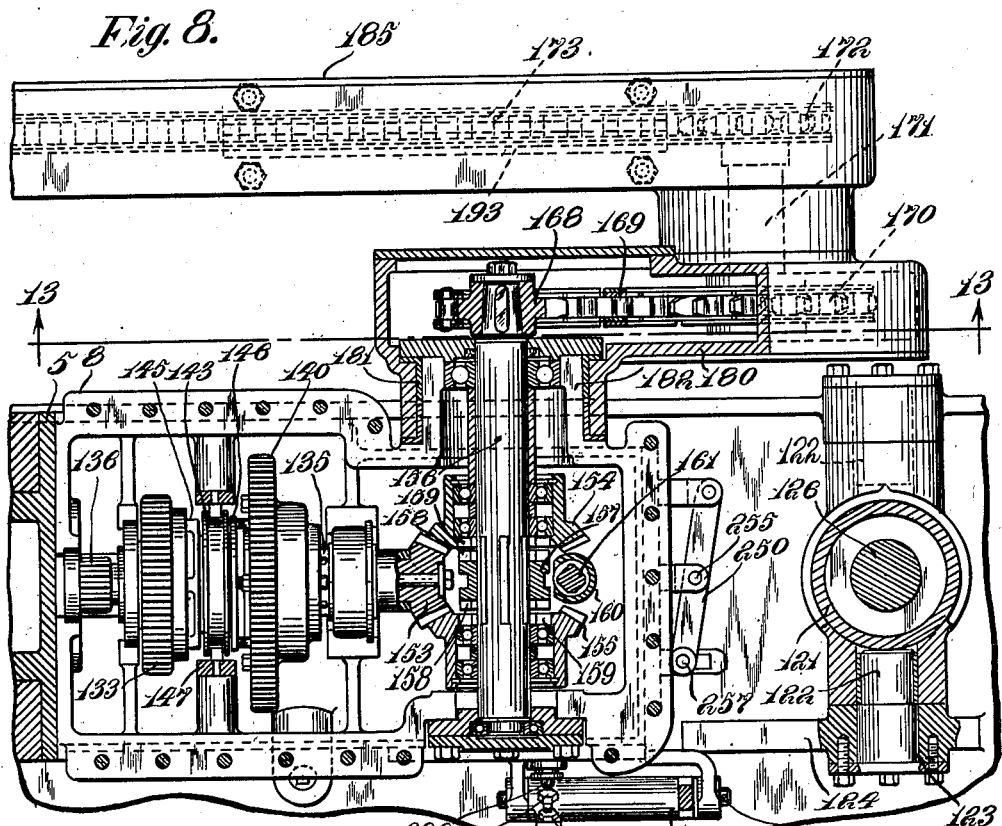
Fig. 8.
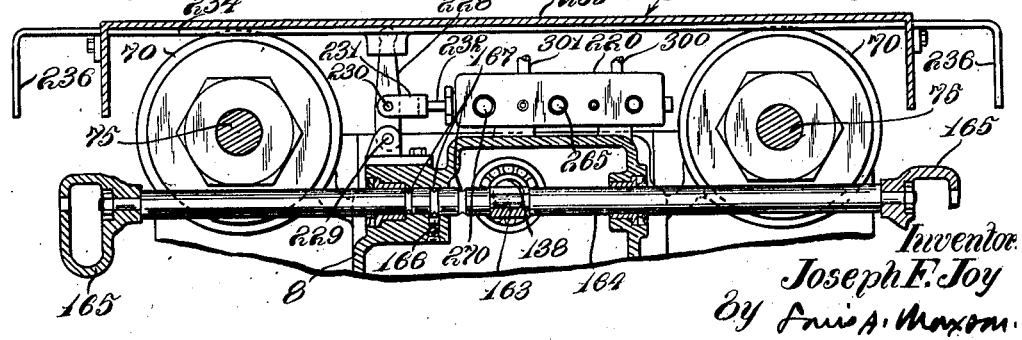
Fig. 9.
Fig. 10.
Inventor
Joseph F. Joy
By Louis A. Maxson
Atty.

Inventor:
Joseph F. Joy

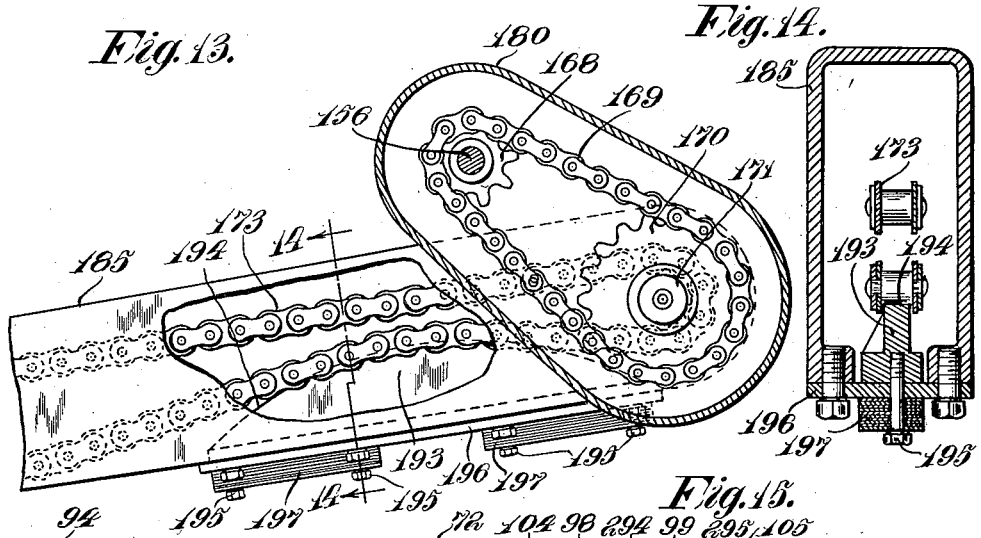
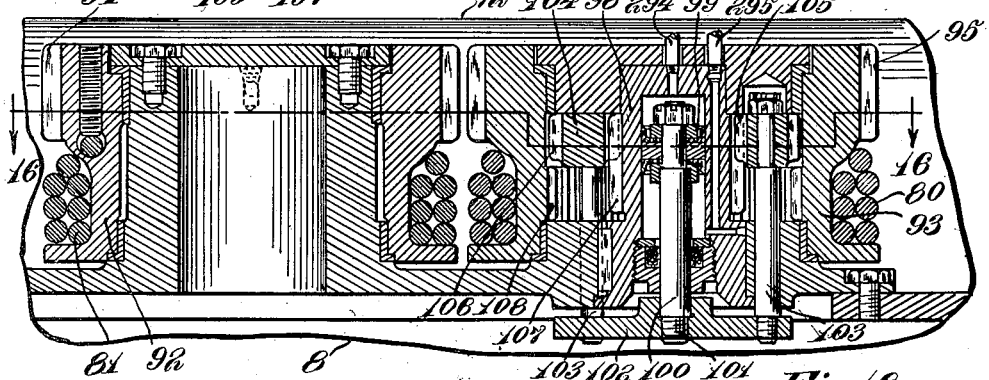
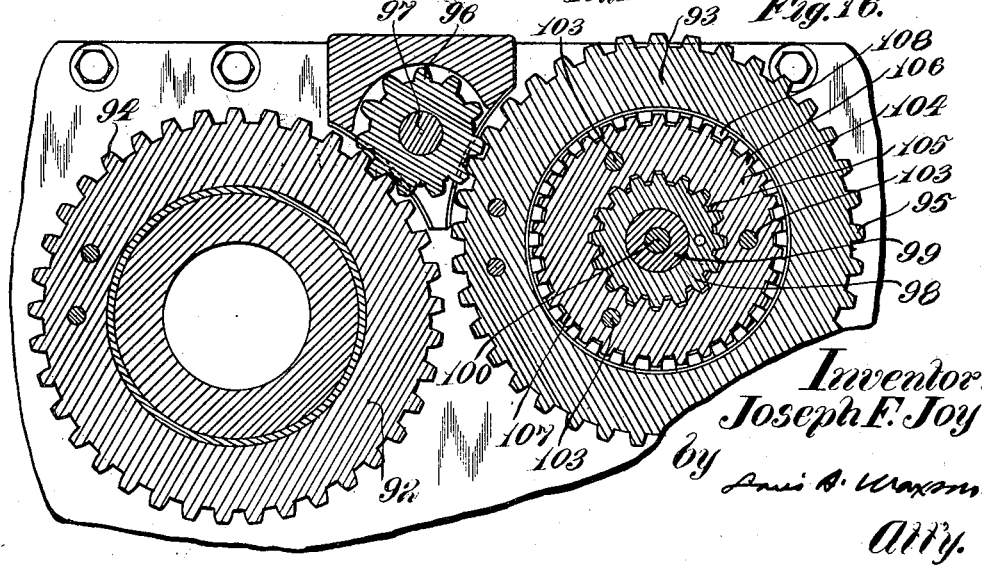

Inventor:
Joseph F. Joy

March 30, 1943.   J. F. JOY   2,315,430
KERF CUTTING MACHINE
Filed July 21, 1938   10 Sheets-Sheet 8
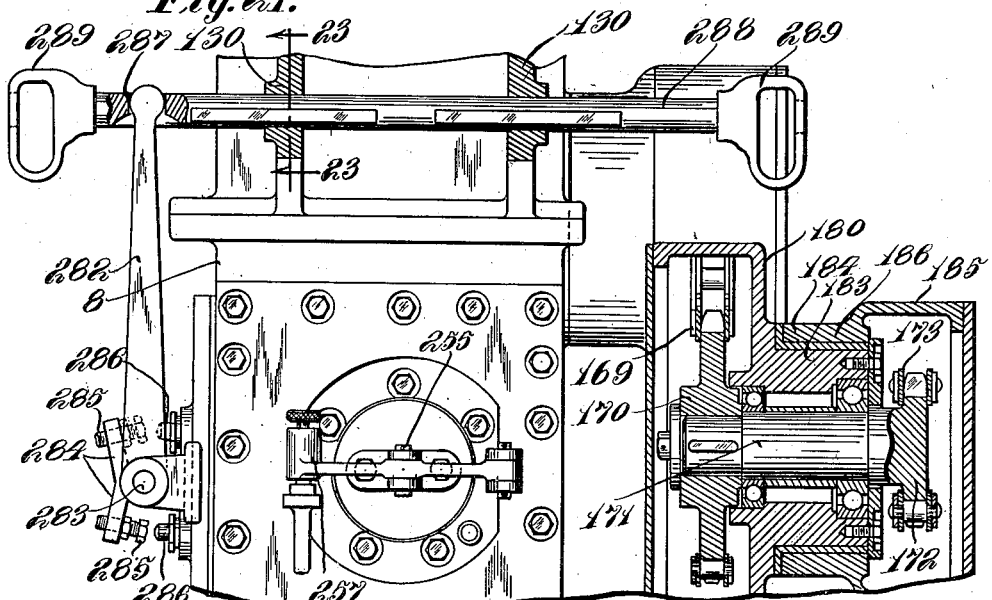
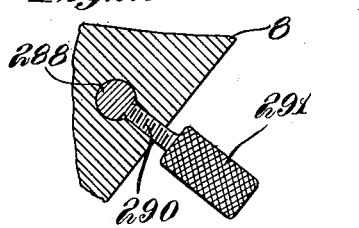
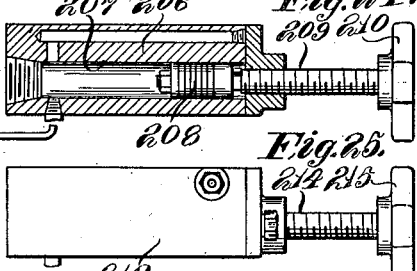
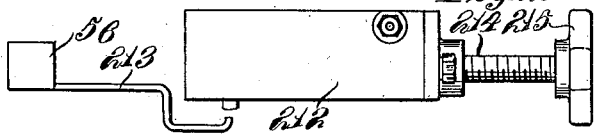
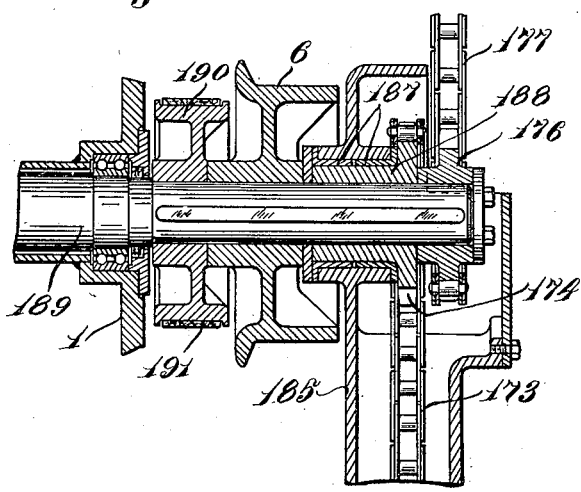
Inventor:
Joseph F. Joy

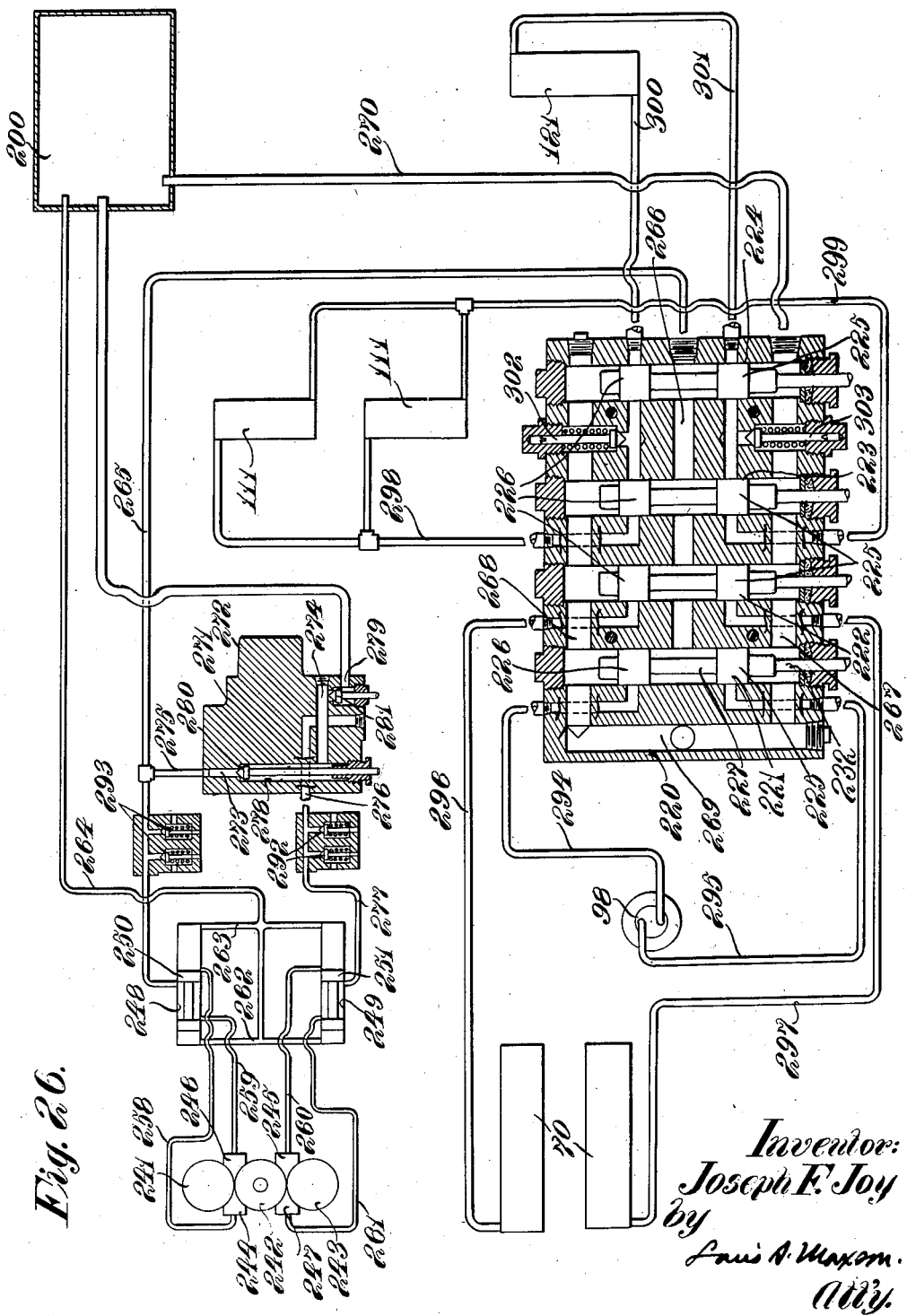

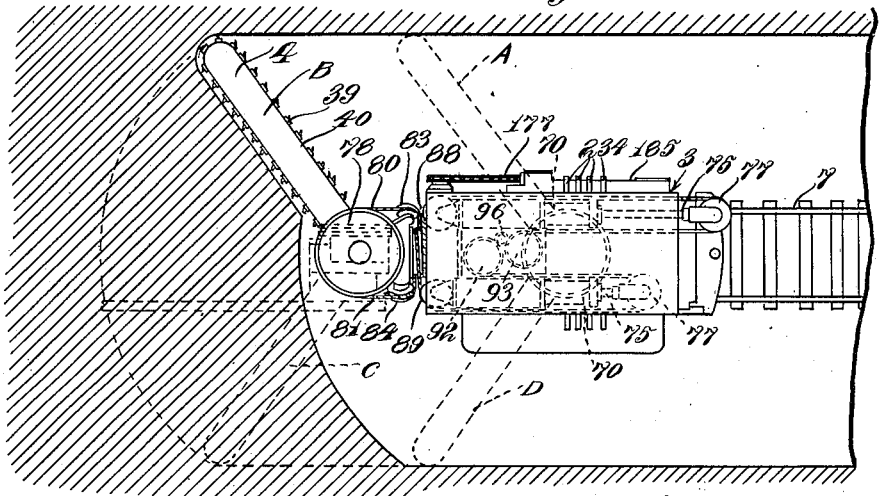
March 30, 1943. J. F. JOY 2,315,430
KERF CUTTING MACHINE
Filed July 21, 1938 10 Sheets-Sheet 10
Inventor:
Joseph F. Joy Patented Mar. 30, 1943

2,315,430

UNITED STATES PATENT OFFICE 2,315,430

KERF CUTTING MACHINE

Joseph F. Joy, Claremont, N. H., assignor to Sullivan Machinery Company, a corporation of Massachusetts Application July 21, 1938, Serial No. 220,571

22 Claims. (Cl. 262—23)

This invention relates to kerf cutting machines, and more particularly, but not exclusively, to improvements in a kerf cutting machine of the combined horizontal and shear cutter, wheel-mounted and track-guided type for cutting kerfs at various locations in a coal seam of a coal mine.

An object of this invention is to provide an improved kerf cutting machine especially designed for use in the cutting of coal in a coal mine and having an improved adjustable supporting structure for the kerf cutter of the kerf cutting mechanism whereby kerfs may be cut at various locations in the coal face. Another object is to provide a novel mechanism for moving the kerf cutter selectively about rectangularly related pivotal axes and embodying power operating elements common to both movements whereby an extremely simple structure is made possible. Yet another object is to provide an improved kerf cutting machine of the hydraulically operated and controlled type whereby an extremely sensitive control of the machine is attained. A still further object is to provide an improved means for moving the kerf cutter selectively about rectangularly related axes and embodying common motor devices for effecting both movements and having associated with the adjusting connections thereof an improved adjusting means whereby the length of connections may be varied during adjustment of the kerf cutter about the different axes. A further object is to provide improved hydraulically operated means for effecting such adjustments of the kerf cutter. A further object is to provide improved locking means for locking the kerf cutter against movement about said rectangularly related axes. Still another object is to provide an improved control means for the various mechanisms of the machine. Another object is to provide improved cable connections between the kerf cutter and the hydraulic motor devices for effecting adjustment of the kerf cutter selectively about the rectangularly related axes and having associated therewith novel means for controlling the free length of the cable connections whereby an increased range of and a more flexible adjustment are made possible. A further object is to provide an improved kerf cutting machine of an extremely compact character, which is also relatively simple and rugged in construction and may be readily operated and controlled. Other objects and advantages of the invention will, however, hereinafter more fully appear.

In the accompanying drawings there is shown for purposes of illustration one form which the invention may assume in practice.

In these drawings:

Fig. 3 is an enlarged view in longitudinal vertical section taken substantially on line 3—3 of Fig. 1.

Fig. 4 is a cross sectional view, somewhat enlarged, taken substantially on line 4—4 of Fig. 2.

Fig. 5 is a horizontal sectional view taken on line 5—5 of Fig. 3.

Fig. 6 is an enlarged cross sectional view, with parts shown in elevation, taken substantially on line 6—6 of Fig. 1.

Fig. 7 is an enlarged cross sectional view taken on line 7—7 of Fig. 1.

Fig. 8 is a horizontal sectional view taken substantially on line 8—8 of Fig. 11.

Fig. 9 is an enlarged view in longitudinal vertical section taken substantially on line 9—9 of Fig. 1.

Fig. 10 is a detail vertical sectional view taken substantially on line 10—10 of Fig. 11.

Fig. 13 is a view in longitudinal vertical section taken substantially on line 13—13 of Fig. 8.

Fig. 14 is an enlarged cross sectional view taken on line 14—14 of Fig. 13.

Fig. 15 is an enlarged vertical sectional view taken substantially on line 15—15 of Fig. 1.

Fig. 16 is a horizontal sectional view taken on line 16—16 of Fig. 15.

Fig. 21 is a detail cross sectional view taken substantially on line 21—21 of Fig. 11.

Fig. 22 is a detail horizontal sectional view taken through one of the rear truck wheels.

Fig. 23 is a detail vertical sectional view taken on line 23—23 of Fig. 21.

Fig. 24 is a somewhat diagrammatic view, with parts shown in section, showing the operating means for the kerf cutter lock.

Fig. 25 is a somewhat diagrammatic view showing the operating means for the cutter head lock.

Fig. 26 is a diagrammatic view showing the hydraulic fluid system.

Fig. 27 is a diagrammatic horizontal view showing the kerf cutting machine in horizontal cutting position in a mine entry.

Fig. 28 is a diagrammatic side elevational view showing the machine in a mine entry with the kerf cutter in horizontal bottom cutting position.

Fig. 29 is a diagrammatic side elevational view showing the machine in a mine entry with the kerf cutter in horizontal top cutting position.

Fig. 30 is a diagrammatic view in side elevation showing the machine in a mine entry with the kerf cutter in a shear cutting position.

Figures 1, 2:
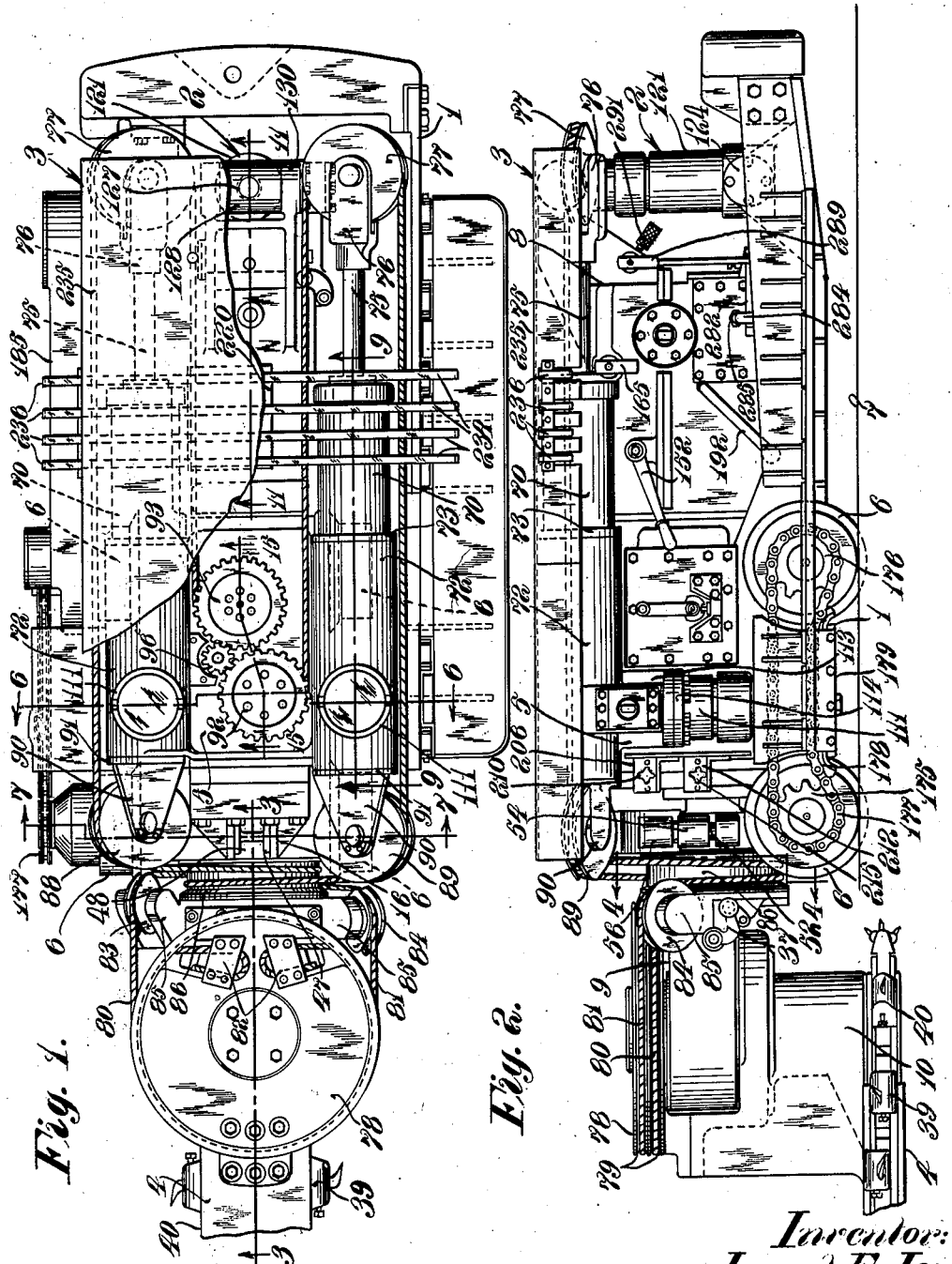
Fig. 1 is a top plan view of a kerf cutting machine constructed in accordance with the illustrative embodiment of the invention, a portion of the frame structure being broken away to show details of construction.
Fig. 2 is a side elevational view of the kerf cutting machine shown in Fig. 1.

In this illustrative embodiment of the invention, there is shown a kerf cutting machine of the combined horizontal and shear cutter type, herein wheel-mounted and track-guided, although it will be evident that various features of the invention may be embodied in kerf cutting machines of various other types and that the machine may be crawler-tread mounted, or mounted to slide on its own bottom directly on the mine floor.

The kerf cutting machine generally comprises a portable base 1 having adjustably mounted thereon, through extensible adjusting devices generally designated 2, a superstructure, generally designated 3, which supports, for movement about rectangularly related axes, an elongated plane kerf cutter 4, the superstructure being adjustable with respect to the base to effect adjustment of the kerf cutter through a series of horizontal cutting planes at different elevations and for tilting the kerf cutter with respect to the horizontal, and the kerf cutter being movable about said rectangularly related axes into horizontal, vertical or any desired intermediate planes and for swinging movement in any of its planes of adjustment. Supported by the adjustable superstructure 3 is a reversible motor 5 which is adapted to drive the various elements of the machine through improved connections as hereinafter described. The portable base 1 is herein in the form of a wheeled truck and comprises a low compact truck frame mounted on wheels 6 adapted to run along a mine trackway 7. The adjustable superstructure 3 comprises an elongated horizontal frame 8 overlying the truck frame and having mounted at the forward end thereof, for rotation relative thereto about a horizontal axis extending longitudinally of the machine, a cutter-carrying head 9, while pivotally mounted on the cutter head for swinging movement relative thereto about an axis at right angles to the head axis is a cutter support 10, by which the kerf cutter 4 is carried, the cutter head 9 and cutter support 10 providing the pivotal mounting structure whereby the kerf cutter may be moved relative to the frame 8 of the adjustable superstructure 3 selectively about rectangularly related axes, as above mentioned. A front head 11 of the motor 5 has a cylindric portion 12 projecting horizontally forwardly therefrom, and the rotatable cutter head 9 has a cylindric sleeve-like bearing portion 13 journaled on bearing sleeves supported by the portion 12, in the manner shown in Fig. 3. The cutter head frame is retained in position on its bearing mounting by a flange 14 formed integral with an annular member 15 secured by screws to the portion 13, and this flange cooperates with upper and lower gibs 16 and 17 suitably secured to the front motor head 11. The swiveled cutter support 10 has a cylindrical portion 18 journaled on bearing sleeves supported by a cylindric portion 19 integral with the cutter head frame; and secured, as by screws, to the cutter head frame is a detachable cover plate 20 having a cylindric projection 21 alined with the cylindric portion 19 and supporting bearing sleeves on which is journaled a sleeve-like bearing portion 22 of a circular member 23, the latter being secured, as by screws, to the swiveled cutter support 10. This circular member 23 engages at 24 an outer surface on the cutter head frame for retaining the cutter support in position on its bearing mounting on the cutter head frame. It will thus be seen that the kerf cutter 4 may be swung in its plane about an axis at right angles to the cutter head axis and that the cutter head axis is horizontally and longitudinally disposed, thereby to enable adjustment of the kerf cutter into horizontal, vertical or any desired intermediate cutting planes.

Now referring to the driving means for the kerf cutter, it will be noted that the power shaft 25 of the motor 5 is horizontally disposed and extends longitudinally of the frame 8 of the adjustable superstructure 3, and fixed to the front end of the power motor shaft is a bevel motor pinion 26, herein meshing with a bevel gear 27 formed integral with a right angle shaft 28 suitably journaled within the cutter head frame; and formed on and driven by the shaft 28 is a spur gear 29 meshing with a large spur gear 30. The hub of the gear 30 is journaled on ball bearings supported by a shaft 31, herein arranged with its axis coincident with the pivotal axis of the cutter support 10. This shaft 31 has fixed thereto a toothed clutch member 32 connectible by a sliding toothed clutch member 33 to clutch teeth 34 formed on the hub of the gear 30, and when the clutch member 33 is slid upwardly interlockingly to engage the clutch teeth 34, the shaft 31 is connected to the gear 30 for driving thereby. The operating means for the clutch member 33 comprises a shipper yoke 35 (Fig. 3) fixed to a transverse operating shaft 36, and secured to the shaft, exteriorly of the cutter head frame, is an operating handle 37 (Fig. 2). The shaft 31 is suitably journaled in ball and roller bearings supported within the cutter head frame and has keyed thereto a chain sprocket 38 which engages and drives an endless cutter chain 39 guided for circulation about the margin of a cutter bar 40 of the kerf cutter 4. It will thus be seen that when the clutch 32, 33, 34 is connected, the cutter chain 39 may be driven from the motor 5 through the bevel gearing 26, 27, spur gears 29, 30, shaft 31 and the chain sprocket 38, and when the clutch is disconnected, the cutter chain may remain idle during running of the motor. The bevel gearing, the spur gearing, the cooperating clutch parts and the gear and shaft bearings are all enclosed within a chamber 41 formed within the cutter head frame, and this chamber is adapted to contain a lubricant bath for the various moving parts.

Improved locking means is provided for locking the rotatable cutter head 9 and swiveled cutter support 10 against pivotal movement about their respective axes. The cutter head lock comprises a brake drum 42, herein formed integral with the annular member 15 secured to the cutter head frame, and this brake drum has a series of external tooth-like annuli 43 cooperating with similar internal tooth-like annuli 44 formed on a contractible brake band 45. This brake band comprises an upper segment 46 having a rectangular projection 47 fitting within a slot 48 formed in a portion of the upper gib 16, and this projection 47 prevents rotation of the brake band with respect to the brake drum. Secured, as by screws 49, to the upper band segment 46 is a lower band segment 50, and the latter has its free end pivotally connected at 51 to a piston rod 52 of a fluid-actuated piston 53, as shown in Fig. 7. The upper band segment 46 has its end portion 54 bored to receive a sleeve 55 which provides a guide for the piston rod 52. The piston 53 is contained within a vertical cylinder 56 having at its inner side rocking engagement with the end portion 54 of the band segment 46. From the foregoing, it will be evident that when fluid under pressure is supplied to the lower end of the cylinder 56, the lower segment of the brake band is drawn upwardly toward the upper segment, thereby frictionally to lock the brake drum against rotation, and as a result to lock the cutter head 9 against rotation about its axis. The lock for the swiveled cutter support 10 comprises a brake drum 57 (Fig. 3) formed integral with the cutter support frame, and this brake drum has a series of internal tooth-like annuli 58 with which cooperate similar external tooth-like annuli 59 (see also Fig. 5) formed on an expansible brake band 60. This brake band comprises a central band segment 61 having a recess 62 within which projects a lug 63 formed integral with the cutter head frame, and this lug acts as a stop for holding the brake band against rotation. Attached to the band segment 61 are band segments 64 and 65. Secured to the cutter head frame is a cylinder block 66 having a bore 67 containing oppositely acting pistons 68, 68, these pistons having piston rods abutting the free ends of the brake band. When fluid under pressure is supplied to the cylinder bore between the pistons, the latter are moved apart, thereby to effect expansion of the brake band; and as a result, the cutter support 10 is locked against pivotal movement with respect to the cutter head 9. The means for supplying hydraulic pressure to the cylinders to act on the pistons to effect application or release of the brake bands will be later described.

The improved mechanism for rotating the cutter head 9 and swinging the cutter support 10, to move the kerf cutter selectively about rectangularly related axes, comprises a pair of horizontal hydraulic cylinders 70, 70 arranged in parallel side by side longitudinal relation on the top of the adjustable superstructure 3, as shown in Figs. 1 and 2. As shown in Fig. 9, each of these cylinders is mounted in a longitudinal bore 71 of a cylindrical tubular portion 72 integral with the frame 8 (see also Fig. 6) and has a flange 73 abutting and fixed to the rearward surface of the portion 72. These cylinders contain reciprocable pistons 74 having piston rods 75 extending rearwardly through the rear packed heads of the cylinders. The rear end of each of the piston rods carries a bracket 76 in which is journaled a sheave or pulley 77. The means for supplying fluid under pressure to these cylinders will be later described. As shown in Fig. 3, formed integral with the circular frame member 23 of the cutter support 10 is a cable drum 78 having cable guiding grooves 79 for guiding cables 80 and 81 about the drum. These cables are attached at one end at 82 (see Fig. 1) to the drum 78 and extend rearwardly from the grooves on the drum around laterally located guide sheaves 83 and 84, respectively, the latter being journaled in brackets 85 secured to the cutter head frame at the opposite sides of the head axis. The cables pass around the sheaves 83 and 84 and extend in opposite directions (Fig. 4) around the opposite sides of a cable guiding drum or pulley 86 loosely journaled on a bearing sleeve 87 surrounding and supported by the circular bearing portion 13 of the cutter head frame. The cables pass about the guiding drum 86 and extend in opposite directions upwardly from the opposite sides thereof and around guide sheaves 88 and 89 respectively, the latter being journaled on brackets 90 secured to circular heads 91 fixed within the forward ends of the bores 71 of the portions 72 of the frame 8. The cables pass about these sheaves 88 and 89 and extend rearwardly therefrom along the outer sides of the hydraulic cylinders 70, in the manner shown in Fig. 1, and pass around the sheaves 77 carried by the piston rods of the pistons 74, the cables passing around these sheaves and then extending forwardly along the inner sides of the hydraulic cylinders 70. The opposite ends of these cables 80 and 81 are wound upon and secured to horizontal drums 92 and 93 arranged on parallel vertical axes on the top of the frame 8 in the space between the hydraulic cylinders 70, as shown in Fig. 1, the cable 80 being wound on the drum 93 and the cable 81 on the drum 92. These drums are rotatable to vary the free lengths of the cables, for a purpose to be later explained, and have formed integral therewith spur gears 94 and 95, respectively, and meshing with these gears is a gear 96 journaled on a vertical shaft 97 (see Fig. 16). It will thus be seen that the drums 92 and 93 are geared together for simultaneous rotation, so that when one drum rotates to unwind its cable, the other drum rotates to wind in its cable. A lock is provided for locking the drums 92, 93 against rotation and comprises, as shown in Fig. 15, a vertical cylinder 98 arranged coaxially within the drum 93 and secured to the frame 8. This cylinder contains a fluid-actuated piston 99 having its piston rod 100 extending downwardly through the packed lower head of the cylinder and threadedly connected at 101 to an operating disc 102. Secured by rods 103 to this disc is an annular lock member 104 having internal and external locking teeth 105 and 106, the internal teeth being slidingly interlocked with teeth 107 formed on the exterior of the stationary cylinder 98. Formed on the drum 93 are locking teeth 108, and when the lock member 104 is slid downwardly into interlocking engagement with the teeth 108, the drum is locked in the stationary frame, and, due to the geared connection between the drums, the drum 92 is locked in stationary relation therewith. The means for supplying fluid under pressure to the cylinder 98 will be later described. From the foregoing, it will be evident that when the cutter head lock 43, 44, 45 is released and the cutter support 10 is locked to the cutter head and fluid under pressure is supplied to the forward end of one of the cylinders 70, the piston 74 therein is moved rearwardly, thereby effecting tensioning of one of the cables 80, 81 while the tension on the other cable is relieved; and as a result, the cable acting on one of the laterally located sheaves 83, 84 effects rotation of the cutter head in one direction about its pivot, the pull of the tensioned cable on the laterally located sheave effecting such rotation of the cutter head. When the cutter head lock is applied and the cutter support lock 57, 58 is released, the cutter support 10 may be swung about its pivot relative to the cutter head whenever fluid under pressure is supplied to one of the cylinders 70 to effect tensioning of one of the cables 80, 81 and to relieve the tension on the other cable. During either cutter head rotation or cutter support swing, when the limit of rearward movement of one of the pistons 74 is reached, an increased range of movement may be attained by locking both the head and cutter support against movement about their axes and releasing the lock for the drums 92 and 93. When the drum lock is released and the retracted piston 74 is moved in a rearward direction within its cylinder, the cable on one of the drums 92, 93 is wound in while the other cable is paid out, thereby to effect retraction of the extended piston. When the previously extended piston is in its retracted position, the drums 92, 93 are again locked against rotation, and when fluid under pressure is supplied to the forward end of the cylinder of the then retracted piston and either the cutter head or cutter support lock is released, one of the cables is again tensioned while the tension on the other cable is relieved; and as a result, cutter head rotation or cutter support swing may be resumed throughout the range of another stroke of the piston 74. It will thus be seen that by varying the free lengths of the cables 80, 81, a range of cutter head rotation and cutter support swing, greater than the range of travel of the pistons 74, may be obtained, thereby eliminating the necessity of cylinders of extreme length.

Figure 11:
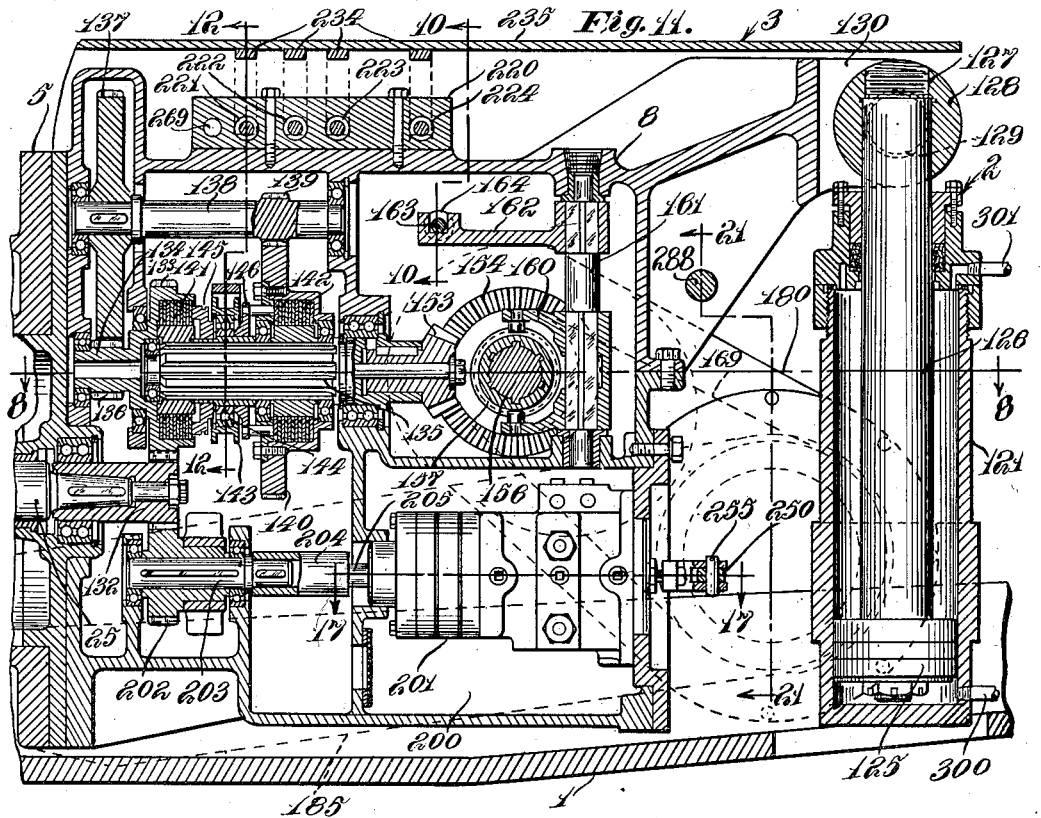
Fig. 11 is a view in longitudinal vertical section taken substantially on line 11—11 of Fig. 1.

Now referring to the extensible adjusting devices 2 for elevating and tilting the adjustable superstructure 3, it will be noted that mounted in bores 110 (Figs. 6 and 9) at the opposite sides of the forward portion of the frame 8 and extending upwardly through the bores 71 in the frame portions 72 in advance of the cylinders 70, are upright reciprocable cylinders 111 containing relatively stationary pistons 112. The bores 110 are formed in upright cylindrical portions 113 of the frame, and the cylinders have flanges 114 abutting and fixed to the lower surfaces of the portions 113. The pistons 112 have piston rods 115 extending downwardly through the packed lower heads of the cylinders and fixed at 116 at their lower ends within the projecting ends 117 of pivot pins 118. These pivot pins are rotatably mounted in alined horizontal bores 119 extending transversely of the machine and formed within upstanding brackets 120 integral with the forward portion of the truck frame. Located at the rear end of the machine at the longitudinal vertical center thereof is an upright hydraulic cylinder 121 pivotally mounted near its lower end on horizontal pivot pins 122 (see Fig. 8) on an axis extending transversely of the machine. These pivot pins are fixed at 123 within upstanding portions 124 of the truck frame. The cylinder 121 contains a reciprocable piston 125 (see Fig. 11) having its piston rod 126 extending upwardly through the packed top head of the cylinder and secured at its upper end at 127 to a member 128, the latter being swivelled at 129 in brackets 130 integral with the frame 8, the swivel axis of the member 128 being arranged parallel with the pivotal axis of the cylinder. The means for supplying fluid under pressure to the front cylinders 111 and the rear cylinder 121 will be later described. From the foregoing, it will be evident that when fluid under pressure is supplied to these cylinders simultaneously, the adjustable superstructure 3 may be raised or lowered in parallelism, and when fluid is supplied to the front cylinders independently of the rear cylinder and vice versa, the superstructure may be tilted in a vertical direction about a transverse axis; and as a result, the kerf cutter may be adjusted through a series of parallel horizontal cutting planes and tilted in a vertical direction with respect to the horizontal. By trapping the fluid within these cylinders, the parts may be locked in adjusted position.

Figure 12:
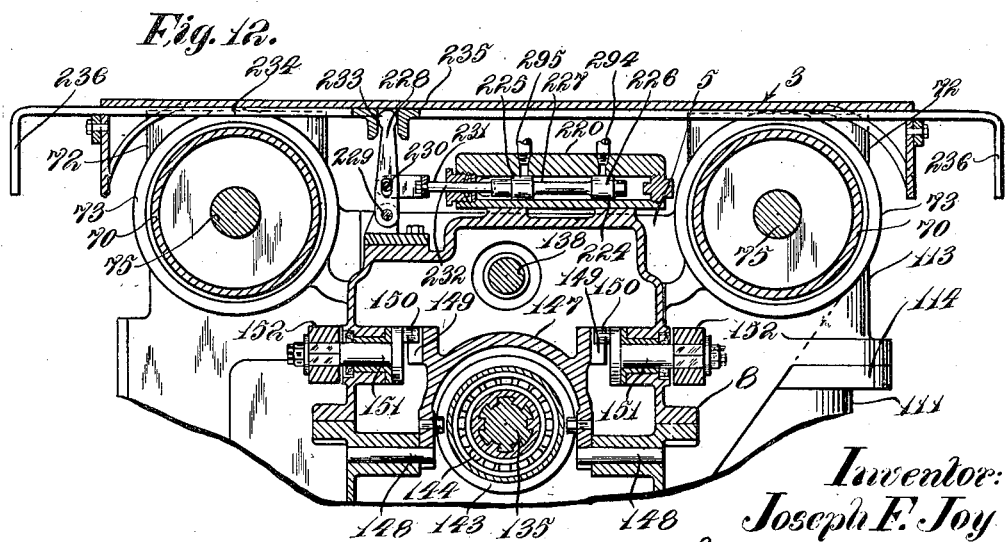
Fig. 12 is a cross sectional view taken substantially on line 12—12 of Fig. 11.

The propelling mechanism for the machine comprises a spur motor pinion 132 (see Fig. 11) keyed to the rear end of the motor power shaft 25 and meshing with a spur gear 133 formed integral with a shaft 134. This shaft is horizontally disposed and extends longitudinally of the frame 8 and is suitably journaled within the frame. Alined with the shaft 134 is a shaft 135 journaled at its rearward end within a ball bearing supported within the frame 8 and at its front end within a ball bearing supported by the shaft 134. Formed on the shaft 134 is a spur gear 136 meshing with a spur gear 137 keyed to a shaft 138, the latter herein arranged parallel with the shaft 134 and likewise journaled within the frame. Formed on the shaft 138 is a spur gear 139 meshing with a spur gear 140, herein arranged coaxial with the gear 133 and journaled on ball bearings supported by the shaft 135. The spur gears 133 and 140 constitute respectively the high and low speed terminal elements of a high and low speed transmission, and are selectively connectible to the shaft 135 by friction clutches 141 and 142, respectively. The operating means for these clutches comprises an annular shipper ring 143 connected to the outer race of a ball thrust bearing 144, and the opposite sides of the inner race of this bearing engage pressure applying members 145 and 146 respectively, for the clutches. As shown in Fig. 12, the shipper ring 143 is externally annularly grooved, and engaged in this groove is a shipper yoke 147 pivoted on a horizontal axis at 148 within the frame. This shipper yoke is slotted at its opposite sides at 149 for engagement with alined eccentrics 150 formed on alined operating shafts 151 suitably journaled in the side walls of the frame. Fixed to these shafts are operating handles 152 conveniently located at the opposite sides of the machine. It will thus be seen that by proper manipulation of a handle of the clutch operating means, the clutches 141 and 142 may be operated to effect drive of the shaft 135 at either a high or a low speed as desired. Keyed to the rear end of the shaft 135 is a bevel gear 153 meshing with and driving in opposite directions bevel gears 154 and 155 (see Fig. 8). The hubs of the bevel gears 154 and 155 are journaled on ball bearings supported by a horizontal shaft 156, this shaft being arranged with its axis extending transversely of the machine and suitably journaled in ball bearings supported within the frame 8. The bevel gears 154 and 155 are alternately connectible to the shaft 156 to effect drive of the latter selectively in opposite directions by means of a jaw clutch member 157 splined to the shaft and having clutch teeth 158 connectible with clutch teeth 159 formed on the gears respectively. The operating means for this jaw clutch member comprises a shipper yoke 160 fixed to a vertical operating shaft 161 (see Fig. 11) suitably rotatably mounted within the frame 8. Secured to the upper end of the shaft 161 is a lever 162 engageable at 163 within an annular groove formed in a horizontal operating rod 164. As shown in Fig. 10, this operating rod is guided within the frame 8 for axial movement transversely of the machine at the top of the latter and has at its opposite ends operating handles 165 conveniently located at the opposite sides of the machine. A spring-pressed plunger 166 is engageable with spaced grooves 167 formed on the operating rod for holding the rod in its different adjusted positions. Again referring to Fig. 8, it will be noted that keyed to the outer end of the shaft 156 is a chain sprocket 168 which is connected by an endless drive chain 169 to a sprocket 170 keyed to a transverse drive shaft 171. Keyed to and driven by the shaft 171 is a chain sprocket 172 connected by an endless drive chain 173 to a chain sprocket 174 secured to rotate with one of the rear truck wheels 6 (see Fig. 22). The front and rear truck wheels at the opposite sides of the machine are connected together in driving relation by chain sprockets 175 and 176 secured to the front and rear truck wheels respectively and connected in driving relation by endless drive chains 177. Guide shoes 178 fixed to brackets 179 attached to the opposite side of the truck frame are provided for guiding the lower runs of the drive chains 177, in the manner shown in Fig. 2. As shown in Figs. 8, 13, 14, 21 and 22, a self-adjusting connection is provided between the drive sprockets 168 and 172 whereby the drive through the chains 169 and 173 is constantly maintained irrespective of the vertically adjusted and tilted positions of the frame 8 of the adjustable superstructure 3. This self-adjusting connection comprises a hollow arm 180 pivotally mounted at one end at 181 on bearing sleeves (Fig. 8) supported by a cylindrical projection 182 integral with the frame 8 and surrounding the shaft 156. The other end of the arm 180 has a cylindrical bearing portion 183 (see Fig. 21) and the shaft 171 is journaled in ball bearings supported within this bearing portion. Pivotally connected to the arm 180 at 184 on an axis coincident with the axis of the shaft 171 is a hollow arm 185 having a cylindrical portion 186 journaled on a bearing sleeve supported by the arm portion 183, and the opposite end of this arm 185 is pivoted on bearing sleeves 187 (Fig. 22) supported by the hub 188 of the chain sprocket 174. The chain and sprocket connection 168, 169 and 170 is housed within the hollow arm 180, while the chain and sprocket connection 172, 173 and 174 is housed within the arm 185. It will thus be seen that when the superstructure is elevated or tilted, the arms 180 and 185, at their pivotal connection, swing relative to one another, while the drive through the chain and sprocket connections is constantly maintained. As shown in Fig. 22, the rear truck wheels are keyed to a rear axle 189, and the sprockets 174 and 176 are also keyed to this axle, so that the rear truck wheels and the sprockets 176 are driven by the sprocket 174. A truck wheel brake is provided comprising a brake drum 190 keyed to the axle 189 and having cooperating therewith a contractible brake band 191 provided with operating means including an operating lever 192. As shown in Figs. 13 and 14, an adjustable chain tightener is provided for the drive chain 173 comprising an arcuate guide shoe 193 arranged within the hollow arm 185 and having an arcuate surface 194 with which the lower run of the chain engages. This shoe is secured by screws 195 to a detachable bottom plate 196 in turn secured, as by screws, to the lower side of the arm. Shims 197 may be transferred from between the heads of the screws and the lower side of the bottom plate to the space between the lower side of the shoe 193 and the top surface of the bottom plate so that the shoe may be adjusted, as desired, with respect to the arm, to vary the tightness of the chain.

Again referring to Fig. 11, it will be noted that the frame 8 has formed therein a liquid reservoir 200 in which is arranged a fluid pump 201 for pumping liquid under pressure from the reservoir to certain of the hydraulically operated devices of the machine. This pump is driven by a spur gear 202 meshing with and driven by the motor pinion 132 and keyed to a shaft 203. This shaft is suitably journaled within ball bearings supported within the frame and is connected by a coupling 204 to the pump drive shaft 205. It will thus be seen that whenever the motor is running, the pump is driven through the spur gearing 132, 202. The connections between the pump and the various devices to which the pump supplies fluid under pressure will be later described.

In Figs. 24 and 25, manually operable pumps are disclosed for supplying fluid under pressure to the operating means for the brakes of the rotatable cutter head 9 and swiveled cutter support 10. Mounted transversely at the forward end of the frame 8 is a cylinder block 206 having a horizontal bore 207 containing a piston 208. This piston may be moved axially within the cylinder bore by a screw 209 threaded within the outer cylinder head and having an operating handle 210. This cylinder bore is connected through a conduit 211 to the bore of the cylinder 67 (see Fig. 5) between the pistons 68, 68, so that when the piston 208 is moved inwardly by the screw, fluid under pressure is forced from the cylinder bore through the conduit 211 to the bore of the cylinder 207, to force apart the pistons 68, 68, thereby to effect application of the cutter support brake. Mounted on the forward end of the frame 8 immediately below the cylinder block 206 is a similar cylinder block 212 having its bore connected by a conduit 213 to the bore of the cylinder 56 beneath the piston 53 (see Fig. 7). The cylinder block bore contains a piston, similar to the piston 208, having an operating screw 214 provided with a handle 215. When the piston of the cylinder block 212 is moved inwardly, fluid under pressure is forced through the conduit 213 to the lower side of the piston 53 to effect upward movement of the latter within its cylinder, thereby to apply the brake for the cutter head 9. When the pistons within the cylinder blocks 206, 212 are permitted to move in the opposite direction, the pistons are relieved of the pressure of the fluid, thereby to effect release of the brakes, in an obvious manner. If desired, in lieu of the manually operable hydraulic means for actuating the cutter head and cutter support locks, the latter may be manually operable by mechanical mechanism, such as a screw and nut mechanism. Also, the locks may be operated by fluid under pressure supplied from the pump 201, instead of the hand operated pumps.

Figure 17:
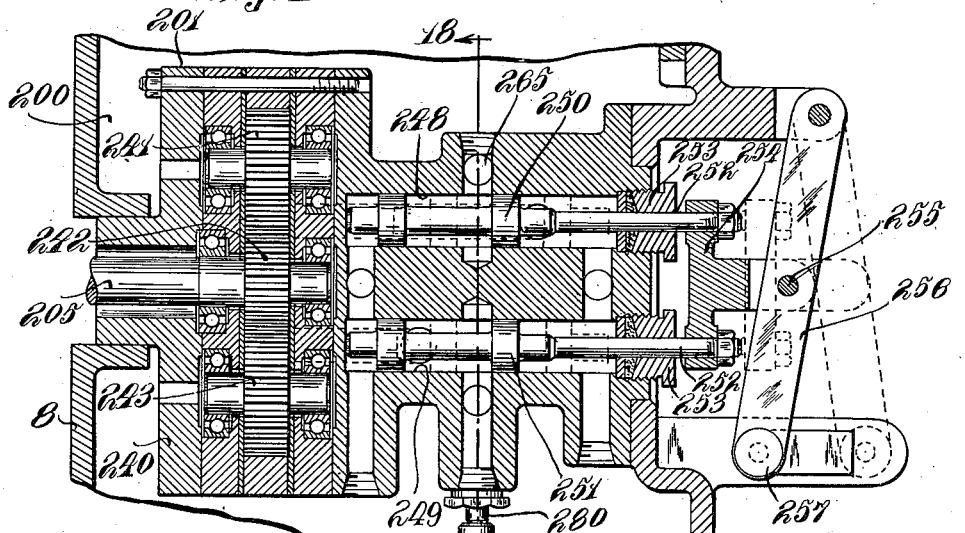
Fig. 17 is a detail vertical sectional view taken on line 17—17 of Fig. 11, showing the fluid pump and the associated control means.
Figure 19:
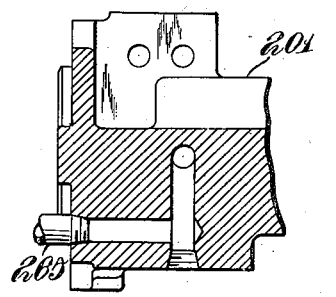
Fig. 19 is a detail cross sectional view taken on line 19—19 of Fig. 18.
Figures 18, 20:
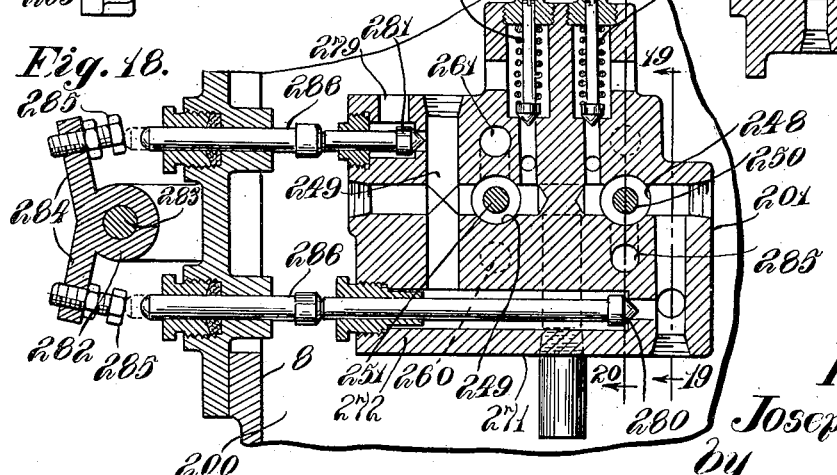
Fig. 18 is a cross sectional view taken substantially on line 18—18 of Fig. 17.
Fig. 20 is a detail cross sectional view taken on line 20—20 of Fig. 18.

Now referring to the hydraulic fluid system associated with the pump 201, it will be noted that mounted on the top of the frame 8 of the adjustable superstructure 3, between the cylinders 70, is a valve box 220 having parallel horizontal bores receiving control valves 221, 222, 223 and 224 (Fig. 26). These control valves are herein of the balanced piston type each comprising spaced spools 225 and 226 (see also Fig. 12) separated by a reduced portion 227. The operating means for these valves comprises levers 228 pivotally mounted at 229 on a bracket secured to the frame, and pivotally connected at 230 to the lever 228 is a member 231 to which the valve stem 232 is secured. The upper end of each of the levers 228 projects into a socket 233 formed on an operating member 234 guided beneath the detachable top plate 235 of the frame 8. Each of these operating members extends transversely across the top of the machine and has operating handles 236 at the opposite ends thereof conveniently located at the opposite sides of the machine. As shown in Fig. 17, the pump 201 is of the triple rotor, intermeshing gear type and is herein made reversible so as to enable operation thereof irrespective of the direction of rotation of the machine driving motor 5. This pump comprises a casing 240 having gear chambers containing three intermeshing gears 241, 242 and 243, each having a horizontal shaft journaled in ball bearings supported within the casing, and the casing is formed with suction chambers 244 and 245 and pressure chambers 246 and 247, at its opposite sides, as shown in Fig. 26. Formed in the pump casing is a pair of parallel longitudinal bores 248 and 249 containing reversing valves 250 and 251, herein of the spooled piston type (Fig. 17), and these valves have operating means comprising parallel plungers 252 extending through the packed heads 253 of the valve bores and secured to a shipper member 254, the latter in turn having pivotally connected thereto at 255 a lever 256. This lever is pivotally mounted on the frame 8 and has an operating handle 257. The suction and pressure chambers 244, 246 are connected by passages 258 and 259 respectively with the valve bore 248, while the suction and pressure chambers 245 and 247 are respectively connected by passages 260 and 261 to the valve bore 249. The forward ends of the valve bores are connected together by a passage 262, while the bores are connected at their rear ends by a passage 263, and these passages are connected by a passage 264 to the liquid reservoir 200. The valve bore 248 is connected by a passage 265 to the pressure supply passage 266 of the valve box 220, the passage 266 communicating with the spaces between the valve spools (Fig. 26). The valve box has discharge passages 267 and 268 communicating with the valve bores at the outer sides of the valve spools and connected together by a passage 269, and the passage 267 is connected back to the liquid reservoir by a passage 270. A by-pass valve mechanism 271 is provided whereby the pressure in the fluid system may be controlled, comprising a valve casing 272, herein formed integral with the pump casing and having passages 273 and 274 respectively connected by passages 275 and 276 with the passage 265 and through a passage 277 with the valve bore 249. The passage 275 communicates with a passage 278, and the passage 274 is communicable with a discharge passage 279 connected back to the fluid reservoir 200. An end seating valve 280 controls the communication of the passage 275 with the passage 278, and an end seating valve 281 controls the communication of the passage 274 with the discharge passage 279. An operating lever 282 is pivotally mounted at 283 on the frame 8 and has oppositely projecting arms 284 carrying adjustable abutment screws 285 engageable with plungers 286 guided in packed openings in the outer wall of the reservoir, and these plungers are engageable with the stems of the valves 280 and 281. This operating lever projects at its upper end into a socket 287 in a horizontal operating rod 288 (Fig. 21) guided for reciprocable movement on the rear portion of the frame 8, and this rod has handles 289 conveniently located at the opposite sides of the machine. Set screws 290 (Fig. 23) each having a knurled handle 291 and arranged at the opposite sides of the frame, are provided for locking the rod 288 in its different positions of adjustment, and the rod is flattened for engagement with these set screws. Pairs of spring loaded safety valves 292 and 293, set to open at relatively different pressures, are provided for preventing excessive pressure in the supply passages 277 and 265. When the valve 280 is opened and the valve 281 is held closed, the pressure in the fluid system is substantially reduced, and when both valves 280 and 281 are opened, the pressure in the fluid system is reduced to a minimum and the fluid flows back to the reservoir through the discharge passage 279. By shifting the position of the reversing valves 250 and 251, the pressure supply passage 265 may be connected to either pressure chamber of the pump and the passage 264 to either suction chamber of the pump, so that irrespective of the direction of rotation of the motor 5, the pump may operate to supply pressure to the pressure supply passage of the valve box 220. The slide valve 221 in the valve box 220 controls the supply of fluid under pressure to the drum lock cylinder 98 and has its bore connected by conduits 294 and 295 to the opposite ends of the cylinder. The slide valve 222 controls the supply of fluid under pressure to the cylinders 70 for swinging and adjusting the kerf cutter, and has its bore connected by conduits 296 and 297 to the forward ends of the cylinders. The slide valve 223 controls the flow of fluid under pressure to the front elevating and tilting cylinders 111, and has its bore connected by conduits 298 and 299 to the opposite ends of the cylinders, while the slide valve 224 controls the flow of fluid to the rear elevating and tilting cylinder 121 and has its bore connected by conduits 300 and 301 to the opposite ends of the cylinder. When these slide valves are in their neutral position, the fluid is trapped within the various cylinders, thereby to lock the devices adjusted thereby in their different adjusted positions. Spring loaded safety valves 302 and 303, set to open at a predetermined pressure, are contained in the valve box 220 for preventing an excessive pressure to be built up in the elevating and tilting cylinders.

The general mode of operation of the improved kerf cutting machine is as follows: The machine may be propelled at a relatively high transport speed along the mine trackway under the control of the friction clutch 141 of the high speed transmission, and may be propelled in either of opposite directions at said high speed under the control of the reversing clutch 157. When the machine is located in cutting position with respect to the coal face and it is desired to make a horizontal cut in the coal, the lock 61, 64, 65 of the cutter support 10 may be released while the cutter head lock remains applied, and fluid under pressure may be supplied to one of the swinging cylinders 70, thereby to effect swinging of the kerf cutter 4 from its central position shown in Fig. 1 laterally toward the right hand rib until the kerf cutter assumes the dotted line position indicated at A in Fig. 27 with its tip end at the right hand rib. The cutter chain clutch 32 may then be connected, thereby to effect rapid circulation of the cutter chain about the margin of the cutter bar of the kerf cutter 4. The operator may then effect operation of the hydraulic cylinders 111 and 121 to effect adjustment of the kerf cutter into a horizontal cutting position at the desired elevation. When the kerf cutter is properly positioned at the right hand rib and the cutter chain is operating, the low speed clutch 142 of the low speed transmission may be applied, and when the reversing clutch 157 is properly connected, the machine may be propelled in a forward direction bodily along the mine trackway to sump the kerf cutter into the coal. When the sumping cut is completed and the kerf cutter has assumed the full line position indicated at B in Fig. 27, the operator may manipulate the brake lever 192 to apply the brake, thereby to hold the truck wheels stationary with respect to the mine trackway, and when fluid under pressure is supplied to the other of the cylinders 70 of the swinging and adjusting means for the kerf cutter, the latter may be swung about its pivot horizontally in its plane from the position indicated at B in Fig. 27 to the dotted line position indicated at C in that figure, thereby to make a horizontal cut transversely across the coal face. When the horizontal swinging cut is completed, the truck wheel brake is released, the reversing clutch 157 shifted to effect reversal of the truck wheel drive, and upon application of the low speed clutch 142 of the low speed transmission, the machine may be propelled in a rearward direction bodily along the mine trackway to move the kerf cutter from the position indicated at C to the position indicated in dotted lines at D in Fig. 27, thereby to withdraw the kerf cutter from the coal. When it is desired to cut a horizontal kerf at the level of the mine floor, the hydraulic cylinders 111 and 121 may be operated to effect lowering of the kerf cutter into the position indicated at E in Fig. 28, and the cutter bar may be sumped in, swung transversely in its plane and withdrawn from the coal in a manner similar to that described above. When it is desired to make a horizontal cut in the coal at the roof level, the cutter support lock is applied and the cutter head lock 45 is released, and fluid under pressure may then be supplied to one of the cylinders 70, to effect rotation of the cutter head 9 about its axis, thereby to move the kerf cutter from a horizontal position below the head axis to a horizontal position above the head axis. Thereafter fluid under pressure may be supplied to the hydraulic cylinders 111 and 121 to elevate the kerf cutter into the horizontal cutting position at the roof level as indicated at F in Fig. 29, and the kerf cutter, in the manner above described, may be sumped into the coal, swung transversely in its plane and withdrawn from the coal. When it is desired to make a shear or vertical cut in the coal face, the cutter head 9 may be rotated into the position wherein the kerf cutter may swing about a horizontal pivot in a vertical plane. When the kerf cutter is in its shear cutting position, the cutter head lock may be applied and the cutter support lock released, and when fluid under pressure is supplied to one of the cylinders 70, the kerf cutter may be swung in a vertical direction about its pivot until it assumes the dotted line position indicated at G in Fig. 30 with its tip end at the roof level. The cutter support lock may then be applied, and upon application of the low speed clutch 142 of the low speed transmission and the connection of the reversing clutch 157, the machine may be propelled in a forward direction bodily along the mine trackway to sump the kerf cutter into the coal. When the kerf cutter assumes its sumped position, as indicated at H in Fig. 30, the truck wheel brake is applied and the cutter support lock released, and when fluid under pressure is supplied to the other of the cylinders 70, the kerf cutter may be swung downwardly in its plane from the position indicated at H in Fig. 30 to the dotted line position indicated at I in that figure, thereby to make a vertical swinging cut. The truck wheel brake is then released, the cutter support lock applied, and when the reversing clutch 157 is shifted to effect truck wheel reversal and the low speed clutch 142 is applied, the machine may be propelled in a rearward direction bodily along the trackway to move the kerf cutter from the position indicated at I to the position indicated in dotted lines at J in Fig. 30, thereby to effect the withdrawal cut. When the kerf cutter is in any of its horizontal cutting positions, fluid under pressure may be supplied to the front cylinders 111 independently of the rear cylinder 121 and vice versa, thereby to effect tilting of the kerf cutter either upwardly or downwardly with respect to the horizontal, thereby to enable the kerf cutter to follow a rolling bottom or uneven coal seam and also to enable horizontal positioning of the kerf cutter when the track is uneven. In addition to the horizontal "arcwall" cuts and the vertical shear cuts above described, the machine may operate in an obvious manner to make longwall or slabbing cuts in the rib at either side of the mine trackway and may operate to make purely swinging cuts while the machine remains stationary with respect to the mine trackway. It will be evident that the machine may cut from left to right simply by reversing the cutters on the cutter chain and reversing the driving motor 5 of the machine, the pump 201, as above described, then operating in a reverse direction under the control of the reversing valves. Other modes of use and advantages of the improved mining machine will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a kerf cutting machine, the combination comprising a frame, a kerf cutter, an adjustable supporting structure mounted on said frame for supporting said kerf cutter for movement about spaced axes relative to said frame, power devices mounted on said frame and relative to which said supporting structure is adjustable, connections operated by said power devices and operatively connected to said kerf cutter for moving the latter about said spaced axes, said power devices being common to movements of said kerf cutter about both of said axes and having for any given relative adjustment of said connections with respect to them a maximum capacity for moving said kerf cutter less than the overall range of adjustability of the latter, and means for effecting relative adjustment between said connections and said power devices to effect cooperation between the latter and different portions of said connections to enable said power devices to move said kerf cutter about said axes through a distance substantially greater than said power devices can move the same in any single given relative adjustment of said connections with respect to said power devices.

2. In a kerf cutting machine, the combination comprising a frame, a kerf cutter, an adjustable supporting structure mounted on said frame for supporting said kerf cutter for movement about rectangularly related axes relative to said frame, extensible power devices mounted on said frame, connections operated by said power devices and operatively connected to said kerf cutter for moving the latter about said axes, said power devices being common to the movements of said kerf cutter about both of said axes, and means associated with said connections for varying the relation thereof with respect to said power devices and said kerf cutter to enable said power devices to move said kerf cutter about said axes through a distance substantially greater than the normal range of extension of said power devices.

3. In a kerf cutting machine, the combination comprising a frame, a kerf cutter, an adjustable supporting structure mounted on said frame for supporting said kerf cutter for movement about spaced axes relative to said frame, fluid actuated cylinder and piston devices mounted on said frame and relative to which said supporting structure is adjustable, connections operated by said fluid actuated cylinder and piston devices and operatively connected to said kerf cutter for moving the latter about said spaced axes, said fluid actuated cylinder and piston devices being common to movements of said kerf cutter about both of said axes and having for any given relative adjustment of said connections with respect to them a maximum capacity for moving said kerf cutter less than the overall range of adjustability of the latter, and means for effecting relative adjustment between said connections and said fluid actuated cylinder and piston devices to effect cooperation between the latter and different portions of said connections to enable said fluid actuated cylinder and piston devices to move said kerf cutter about said axes through a distance substantially greater than the maximum range of movement which said fluid actuated cylinder and piston devices can effect in any single given adjustment of said connections with respect to them.

4. In a kerf cutting machine, the combination comprising a frame, a kerf cutter, an adjustable supporting structure mounted on said frame for supporting said kerf cutter for movement about rectangularly related axes relative to said frame, fluid actuated cylinder and piston devices mounted on said frame, flexible connections operated by said cylinder and piston devices and operatively connected to said kerf cutter for moving the latter about said axes, said cylinder and piston devices being common to the movements of said kerf cutter about both of said axes, and means connected to said flexible connections for varying the free length of the latter to enable said cylinder and piston devices to move said kerf cutter about said axes through a distance substantially greater than the normal range of movement of said cylinder and piston devices.

5. In a kerf cutting machine, the combination of a frame, a kerf cutter, an adjustable supporting structure mounted on said frame for supporting said kerf cutter for movement about rectangularly related axes relative to said frame, motor operated devices on said frame, cable connections operatively connected between said devices and said kerf cutter, said motor operated devices operative to tension said cable connections one at a time thereby selectively to effect movement of said kerf cutter about said axes, means associated with said cable connections for varying the free length thereof to enable said devices to move the kerf cutter about said axes through a distance substantially greater than the normal range of movement of said devices, and means for holding said kerf cutter against movement about one of said axes when movement about said other axis is effected through said connections.

6. In a kerf cutting machine, the combination of a frame, a kerf cutter, an adjustable supporting structure mounted on said frame for supporting said kerf cutter for movement about rectangularly related axes relative to said frame, motor operated devices on said frame, cable connections operatively connected between said devices and said kerf cutter, said motor operated devices operative to tension said cable connections one at a time thereby selectively to effect movement of said kerf cutter about said axes, relatively rotatable cable winding drums on which said connections are wound for varying the free length thereof to enable said devices to move the kerf cutter about said axes through a distance substantially greater than the normal range of movement of said devices, and means for holding said kerf cutter against movement about one of said axes when movement about said other axis is effected through said connections.

7. In a kerf cutting machine, the combination of a frame, a cutter head mounted on said frame for rotation with respect thereto about a horizontal axis, a kerf cutter pivotally mounted on said cutter head to swing relative thereto about an axis at right angles to the head axis, a pair of cables each connected at one end to said kerf cutter and guided intermediate its ends on said cutter head, relatively rotatable cable winding drums mounted on said frame on which the cables are wound and to which the other ends of the cables are respectively secured, and extensible power devices mounted on said frame and engaging intermediate portions of said cables for effecting tensioning of said cables one at a time thereby selectively to effect rotation of said cutter head and swinging of said kerf cutter, and means for causing rotation of said drums for increasing the free length of one of said cables and decreasing the free length of the other thereby to enable head rotation and cutter swing through a range substantially beyond the normal range of movement of said extensible power devices.

8. In a kerf cutting machine, the combination of a frame, a cutter head mounted on said frame for rotation with respect thereto about a horizontal axis, a kerf cutter pivotally mounted on said cutter head to swing relative thereto about an axis at right angles to the head axis, a pair of cables each connected at one end to said kerf cutter and guided intermediate its ends on said cutter head, relatively rotatable cable winding drums connected together for simultaneous rotation in like directions and mounted on said frame, on which drums the cables are wound and to which the other ends of the cables are respectively secured, and extensible power devices mounted on said frame and engaging intermediate portions of said cables for effecting tensioning of one cable and untensioning of the other thereby selectively to effect rotation of said cutter head and swinging of said kerf cutter, and means for causing rotation of said drums for increasing the free length of one of said cables and decreasing the free length of the other thereby to enable head rotation and cutter swing through a range substantially beyond the normal range of movement of said extensible power devices.

9. In a kerf cutting machine, the combination of a frame, a cutter head mounted on said frame for rotation with respect thereto about a horizontal axis, a kerf cutter pivotally mounted on said cutter head to swing relative thereto about an axis at right angles to the head axis, a pair of cables each connected at one end to said kerf cutter and guided intermediate its ends on said cutter head, relatively rotatable cable winding drums connected together for simultaneous rotation in like directions and mounted on said frame, on which drums the cables are wound and to which the other ends of the cables are respectively secured, extensible power devices mounted on said frame and engaging intermediate portions of said cables for effecting tensioning of one cable and untensioning of the other thereby selectively to effect rotation of said cutter head and swinging of said kerf cutter, means for causing rotation of said drums for increasing the free length of one of said cables and decreasing the free length of the other thereby to enable head rotation and cutter swing through a range substantially beyond the normal range of movement of said extensible power devices, and means for locking said drums against rotation upon movement of said extensible devices in one direction and releasible to permit free rotation of said drums upon movement of said devices in the opposite direction.

10. In a kerf cutting machine, the combination of a frame, a kerf cutter, an adjustable supporting structure mounted on said frame for supporting said kerf cutter for movement relative thereto about rectangularly related axes, a power device having a limited range of movement, connections between said power device and said kerf cutter whereby said power device may effect swinging of said kerf cutter selectively about said axes, said kerf cutter movable about said axes a greater distance than said connections can move the same when said power device operates throughout its full potential range of movement, and means for adjusting said connections relative to said power device to bring different portions thereof into cooperative relation with said power device to enable the latter by repeated movement to move said kerf cutter about said axes through a distance substantially greater than that which a single maximum range movement of said power device can effect.

11. In a kerf cutting machine, the combination of a frame, a kerf cutter, an adjustable supporting structure mounted on said frame for supporting said kerf cutter for movement relative thereto about rectangularly related axes, a power device having a limited range of movement, a cable connection opearted by said power device and operatively connected at one end to said kerf cutter and at the other end to said frame, said power device engaging an intermediate portion of said cable connection and said kerf cutter movable about said axes a greater distance than said cable connection can move the same when said power device operates throughout its full potential range of movement, and means for adjusting said point of connection of said cable connection with said frame to vary the free length of said cable connection thereby to bring a different portion thereof into cooperative relation with said power device to enable the latter by repeated movement to move said kerf cutter about said axes through a distance substantially greater than that which a single maximum range movement of said power device can effect.

12. In a kerf cutting machine, the combination comprising a frame, a kerf cutter, an adjustable supporting structure mounted on said frame for supporting said kerf cutter for movement about spaced axes relative to said frame, power devices mounted on said frame and relative to which said supporting structure is adjustable, connections operated by said power devices and operatively connected to said kerf cutter for moving the latter about said spaced axes, said connections further having coacting with them adjustable devices, said power devices having for a given adjustment of said adjustable devices a maximum capacity for moving said kerf cutter less than the overall range of adjustability of the latter and said power devices being common to movement of said kerf cutter about both of said axes, said adjustable devices having means for adjusting them to effect a redisposition of said connections to enable said power devices by repeated movement to move said kerf cutter about said axes through a range of adjustment greater than that possible with any single given adjustment of said adjustable devices.

13. In a kerf cutting machine, the combination comprising a kerf cutter, a rotatable support for said kerf cutter, a power device having a limited range of movement, connections operated by said power device and operatively connected to said cutter support for rotating the latter, said support rotatable through a greater distance than that through which said connections are operative to move the same upon a single movement of said power device through its full range of movement, and means associated with said connections for varying the relation thereof with respect to said power device and said cutter support to bring different portions of said connections into cooperative relation with said power device to enable the latter by successive movements to rotate said cutter support through a distance substantially greater than a single movement of said power device throughout its limited range can effect.

14. In a kerf cutting machine, the combination comprising a kerf cutter, a support for said kerf cutter rotatable about spaced axes, a power device having a limited range of movement, connections operated by said power device and operatively connected to said cutter support for rotating the latter about said axes, said power device being common to the rotation of said support about both of said axes and said support being rotatable a distance about said axes greater than said connections can move the same upon a single movement of said power device through its full range of movement, and means associated with said connections for varying the relation thereof with respect to said power device and said cutter support to bring different portions of said connections into cooperative relation with said power device to enable the latter by successive movements to rotate said cutter support about said axes through a distance substantially greater than a single movement of said power device throughout its limited range can effect.

15. In a kerf cutting machine, the combination comprising a kerf cutter, a rotatable support for said kerf cutter, a power device having a limited range of movement, connections operated by said power device and operatively connected to said cutter support for rotating the latter, said support rotatable through a greater distance than that through which said connections are operative to move the same upon a single movement of said power device through its full range of movement, and means associated with said connections for varying the relation thereof with respect to said power device and said cutter support to bring different portions of said connections into cooperative relation with said power device to enable the latter by successive movements to rotate said cutter support through a distance substantially greater than a single movement of said power device throughout its limited range can effect, said last mentioned means including means operated by said power device for varying the relation of said connections with respect to said power device and said cutter support.

16. In a kerf cutting machine, the combination comprising a kerf cutter, a rotatable support for said kerf cutter, an extensible power device, connections operated by said power device and operatively connected to said cutter support for rotating the latter, said support rotatable through a greater distance than that through which said connections are operative to move the same upon a single full extension of said power device, and means associated with said connections for varying the relation thereof with respect to said power device and said cutter support to bring different portions of said connections into cooperative relation with said power device to enable the latter by successive extensions to rotate said cutter support through a distance substantially greater than a single full extension of said power device can effect.

17. In a kerf cutting machine, the combination comprising a kerf cutter, a support for said kerf cutter rotatable about spaced axes, an extensible power device, connections operated by said power device and operatively connected to said cutter support for rotating the latter about said axes, said power device being common to the rotation of said support about both of said axes and said support being rotatable about said axes through a greater distance than that through which said connections are operative to move the same upon a single full extension of said power device, and means associated with said connections for varying the relation thereof with respect to said power device and said cutter support to bring different portions of said connections into cooperative relation with said power device to enable the latter by successive extensions to rotate said cutter support about said axes through a distance substantially greater than a single full extension of said power device can effect.

18. In a kerf cutting machine, the combination comprising a kerf cutter, a rotatable support for said kerf cutter, and power operated cable and pulley mechanism for rotating said support including a cable operatively connected to said cutter support and adapted to be actuated by power, and cable guiding means including a cable guiding pulley freely rotatable relative to said support about an axis coincident with the axis of support rotation.

19. In a kerf cutting machine, the combination comprising a kerf cutter, a rotatable support for said kerf cutter, and power operated cable and pulley mechanism for rotating said support including a cable operatively connected to said cutter support and adapted to be actuated by power, and cable guiding means including a cable guiding pulley freely rotatable relative to said support about an axis coincident with the axis of support rotation and a guiding pulley mounted in a laterally located position on said cutter support and with which said cable also engages.

20. In a kerf cutting machine, the combination comprising a kerf cutter, a rotatable support for said kerf cutter, a power device having a limited range of movement, connections operated by said power device and operatively connected to said cutter support for rotating the latter, said cutter support rotatable a greater distance than said connections can rotate the same when said power device operates throughout its full potential range of movement, and means for effecting relative adjustment between said connections and said power device to effect cooperation between the latter and different portions of said connections to enable said power device by repeated movement to rotate said cutter support through a distance substantially greater than that which a single maximum range movement of said power device can effect.

21. In a kerf cutting machine, the combination comprising a kerf cutter, a rotatable support for said kerf cutter, and power operated flexible connections for rotating said support including a flexible element operatively connected to said cutter support and adapted to be actuated by power, and a rotatable guide for said flexible element and with which said flexible element engages, said guide being rotatable relative to said support about an axis in the same straight line with and at least in part between the ends of the axis of support rotation.

22. In a kerf cutting machine, in combination, a frame, a kerf cutter, means for supporting said kerf cutter for adjustment relative to said frame, and means for effecting adjustment of said kerf cutter relative to said frame including a flexible connection operatively connected to said kerf cutter and operative through traction exerted thereon to effect adjustment of said kerf cutter relative to said frame, a power device cooperating with said connection for causing the same to exert traction to effect adjustment of said kerf cutter, said power device having a limited range of operating movement such that a full operating movement thereof is insufficient to cause said connection to move said kerf cutter through its full range of adjustment relative to said frame, and a further device cooperating with said connection and adjustable so to alter the disposition of the latter that successive operating movements of said power device will effect through traction upon said connection a full-range adjustment of said kerf cutter relative to said frame.

JOSEPH F. JOY.

CERTIFICATE OF CORRECTION.

Patent No. 2,315,430.　　　　　　　　　　　　March 30, 1943.

JOSEPH F. JOY.

It is hereby certified that error appears in the printed specification of the above numbered patent requiring correction as follows: Page 3, second column, line 64, for "in" read --to--; page 9, first column, line 72, claim 11, for "opearted" read --operated--; and that the said Letters Patent should be read with this correction therein that the same may conform to the record of the case in the Patent Office.

Signed and sealed this 7th day of September, A. D. 1943.

Henry Van Arsdale,
　　　　　　　　　　　　　　　　Acting Commissioner of Patents.

(Seal)